US009928532B2

(12) United States Patent
Torres

(10) Patent No.: US 9,928,532 B2
(45) Date of Patent: Mar. 27, 2018

(54) IMAGE BASED SEARCH ENGINE

(71) Applicant: Daniel Torres, Williamstown, NJ (US)

(72) Inventor: Daniel Torres, Williamstown, NJ (US)

( * ) Notice: Subject to any disclaimer, the term of this patent is extended or adjusted under 35 U.S.C. 154(b) by 372 days.

(21) Appl. No.: 14/637,631

(22) Filed: Mar. 4, 2015

(65) Prior Publication Data

US 2015/0254751 A1    Sep. 10, 2015

Related U.S. Application Data

(60) Provisional application No. 61/947,583, filed on Mar. 4, 2014, provisional application No. 62/079,695, filed on Nov. 14, 2014.

(51) Int. Cl.
*G06Q 30/06* (2012.01)
*G06F 17/30* (2006.01)

(52) U.S. Cl.
CPC ... *G06Q 30/0625* (2013.01); *G06F 17/30825* (2013.01); *G06F 17/30864* (2013.01); *G06Q 30/0623* (2013.01); *G06Q 30/0627* (2013.01); *G06Q 30/0613* (2013.01); *G06Q 30/0619* (2013.01)

(58) Field of Classification Search
None
See application file for complete search history.

(56) References Cited

U.S. PATENT DOCUMENTS

| | | | |
|---|---|---|---|
| 5,579,471 A | 11/1996 | Barber et al. | |
| 6,393,147 B2 | 5/2002 | Danneels et al. | |
| 6,504,571 B1 | 1/2003 | Narayanaswami et al. | |
| 7,016,532 B2 | 3/2006 | Boncyk et al. | |
| 7,565,139 B2 | 7/2009 | Neven, Sr. et al. | |
| 7,657,126 B2 | 2/2010 | Gokturk et al. | |
| 7,707,218 B2 * | 4/2010 | Gocht | G06Q 30/02 707/758 |
| 7,725,484 B2 | 5/2010 | Nister et al. | |
| 7,734,729 B2 | 6/2010 | Du et al. | |
| 7,882,124 B2 | 2/2011 | Slaney et al. | |
| 8,027,549 B2 * | 9/2011 | Podilchuk | G06F 17/30277 382/159 |
| 8,194,986 B2 | 6/2012 | Conwell | |
| 8,229,160 B2 | 7/2012 | Rosenblatt | |
| 8,285,713 B2 | 10/2012 | Luo et al. | |
| 8,315,423 B1 | 11/2012 | Jing et al. | |
| 8,331,679 B2 | 12/2012 | Boncyk et al. | |

(Continued)

*Primary Examiner* — Nicholas D Rosen
(74) *Attorney, Agent, or Firm* — Gearhart Law LLC

(57) ABSTRACT

An image based consumer to business search engine is described and taught. The consumer can take a video or capture an image of an item and upload to the search engine along with an optional textual description. The returned search results are automatically contacted via email with the search information. The third party vendor can then, through a variety of channels, contact the consumer with information specific to the item, giving the consumer ample opportunity to make an informed purchasing decision. Once the consumer has decided the query is no longer necessary, the query is terminated and the offers cease. Alternatively, the search results may be presented by an analytical algorithm that mines the textual description and image(s) for data to compare to existing products and vendors to create matches for the consumer.

17 Claims, 4 Drawing Sheets

(56) References Cited

U.S. PATENT DOCUMENTS

| | | | |
|---|---|---|---|
| 8,412,696 B2* | 4/2013 | Zhang | G06F 17/30545 707/706 |
| 8,418,919 B1 | 4/2013 | Beyda | |
| 8,421,872 B2 | 4/2013 | Neven, Sr. | |
| 8,503,787 B2 | 8/2013 | Boncyk et al. | |
| 8,520,897 B2 | 8/2013 | Boncyk et al. | |
| 8,548,878 B1* | 10/2013 | Graham | G06K 9/6218 705/26.64 |
| 8,553,981 B2 | 10/2013 | Mei et al. | |
| 8,560,517 B2 | 10/2013 | Yang et al. | |
| 8,600,824 B2* | 12/2013 | Sunkada | G06F 17/30247 705/26.1 |
| 8,630,494 B1* | 1/2014 | Svendsen | G06K 9/00677 382/209 |
| 8,732,035 B2* | 5/2014 | Finn | G06Q 30/00 705/26.1 |
| 2005/0261990 A1* | 11/2005 | Gocht | G06Q 30/02 707/758 |
| 2006/0012677 A1 | 1/2006 | Neven et al. | |
| 2006/0056687 A1 | 3/2006 | Brandt | |
| 2007/0071323 A1* | 3/2007 | Kontsevich | G06F 17/30247 382/190 |
| 2007/0286528 A1* | 12/2007 | Podilchuk | G06F 17/30277 382/305 |
| 2008/0120290 A1 | 5/2008 | Delgo et al. | |
| 2008/0205795 A1 | 8/2008 | Marques et al. | |
| 2008/0249898 A1* | 10/2008 | Ratnakar | G01S 5/0018 705/27.1 |
| 2008/0263009 A1* | 10/2008 | Buettner | G06F 17/30979 |
| 2008/0273795 A1 | 11/2008 | Ofek et al. | |
| 2009/0237546 A1 | 9/2009 | Bloebaum et al. | |
| 2009/0319390 A1* | 12/2009 | Finn | G06Q 30/00 705/26.1 |
| 2010/0135582 A1 | 6/2010 | Gokturk et al. | |
| 2010/0166339 A1 | 7/2010 | Gokturk et al. | |
| 2010/0183225 A1 | 7/2010 | Vantaram et al. | |
| 2010/0189354 A1 | 7/2010 | de Campos et al. | |
| 2010/0226564 A1 | 9/2010 | Marchesotti et al. | |
| 2011/0142335 A1 | 6/2011 | Ghanem et al. | |
| 2011/0191211 A1 | 8/2011 | Lin | |
| 2011/0270697 A1* | 11/2011 | Sunkada | G06F 17/30247 705/26.1 |
| 2012/0092357 A1 | 4/2012 | Wang et al. | |
| 2012/0158482 A1* | 6/2012 | Paradise | G06Q 30/0224 705/14.25 |
| 2012/0197928 A1* | 8/2012 | Zhang | G06F 17/30545 707/769 |
| 2012/0209470 A1 | 8/2012 | Gilbert et al. | |
| 2013/0145273 A1* | 6/2013 | Hymel | G06F 3/0484 715/733 |
| 2014/0289821 A1* | 9/2014 | Wilson | G06Q 20/42 726/5 |
| 2014/0310304 A1* | 10/2014 | Bhardwaj | G06F 17/30277 707/769 |

\* cited by examiner

IMAGE BASED SEARCH ENGINE

CLAIM OF PRIORITY

This application claims the priority of U.S. Ser. No. 61/947,583 filed on Mar. 4, 2014, and U.S. Ser. No. 62/079,695 filed on Nov. 14, 2014, the contents of which are fully incorporated herein by reference.

FIELD OF THE INVENTION

The field of the invention relates to image searching conducted through a network, namely finding items based on an image of the item. In particular, to using an optical sensor to capture a representation of an item and uploading that representation to a network accessible by third parties.

BACKGROUND OF THE INVENTION

Content based image retrieval (CIBR) is a technique that involves retrieving images from a database based on the content of the image rather than the associated metadata. Generally, there has been a recent rise in interest in this methodology, due to the shortcomings of searching by metadata. Metadata is information such as keywords and tags for searchable items. Metadata searching can be unreliable and is prone to human error in using various image descriptors. Thus, image searching by content rather than descriptors can return more favorable and relevant results for the searcher.

Currently, CIBR is typically achieved using an analysis of the colors, sizes, shapes, and textures belonging to a query image. These reference points are then measured as a distance from one another and these distance factors are compared to and indexed relative to other known images (typically from a database). There are still a number of shortcomings with this method of searching as the technology is constantly evolving.

For example, current CIBR based searching is still quite limited in the functions it can perform. Often, the image results will contain images with similar visual patterns/colors but be associated with a completely separate object or class of objects. This method of searching also does not permit for third party contact or solicitations or further subsequent up selling or promotional opportunities. The present invention meets and exceeds all these objectives by using an image based search engine with a third party human input.

Review of Related Technology:

U.S. Pat. No. 8,520,897 pertains to collecting object information derived from object images. Search terms are derived automatically from images captured by a camera equipped cell phone, PDA, or other image capturing device, submitted to a search engine to obtain information of interest, and at least a portion of the resulting information is transmitted back locally to, or nearby, the device that captured the image.

U.S. Pat. No. 8,421,872 pertains to an image based inquiry system for use with mobile telephones with integrated cameras. An increasing number of mobile telephones and computers are being equipped with a camera. Thus, instead of simple text strings, it is also possible to send images as queries to search engines or databases. Moreover, advances in image recognition allow a greater degree of automated recognition of objects, strings of letters, or symbols in digital images. This makes it possible to convert the graphical information into a symbolic format, for example, plain text, in order to then access information about the object shown.

U.S. Pat. No. 8,315,423 pertains to techniques for providing information in an image-based information retrieval system. An image including an object is received from a mobile device over a network of computer. The object included the image is matched with a stored representation of the object. Information related to the object is identified based on an association between the identified information and the stored representation of the object. Presentation, over the network of computers on the mobile device, of the identified information is enabled.

U.S. Pat. No. 7,734,729 pertains to a method, system, and apparatus for allowing users to readily obtain information associated with a selected item from a remote location. More specifically, a user at the location of the first entity operates a portable imaging device to capture an image of identifying data, such as a barcode, that identifies a selected item. The captured image is then communicated to a server operated by a second entity that is different than the first entity to obtain item information (e.g., price, availability, etc.) associated with the selected item. The item information is communicated back to the portable imaging device for display to the user while the user remains at the location of the first entity. In other embodiments, the information extracted from the captured image may also be used to forecast future purchasing activity for the selected item.

Various devices are known in the art. However, their structure and means of operation are substantially different from the present disclosure. The other known image searching tools all are primarily computer based. The technology involving computer vision doesn't currently allow for the identification of many articles of manufacture. As such, misidentification and retrieval of unreliable results is a commonplace. The current invention provides for image based searching with a human element to circumvent these shortcomings. Thus, the other inventions fail to solve all the problems taught by the present disclosure. At least one embodiment of this invention is presented in the drawings below and will be described in more detail herein.

SUMMARY OF THE INVENTION

An interactive searching system is described and taught having a user possessing an electronic mobile device having an optical sensor configured to capture a representation of an item; a server computer coupled to a network having a categorized database, wherein the user uploads at least the representation of the item to the network, wherein results are returned to the user and automatically contacted via an electronic message; and a plurality of computers capable of accessing the network, wherein a third party uses at least one of the plurality of computers to access the electronic message and ascertain whether the representation of an item uploaded to the categorized database is present in their inventory.

In another aspect of the invention there is a method of image based searching using a search engine having the steps of a user creating a query comprising at least a representation of an item and/or a textual descriptor to a search engine; receiving a plurality of first search results, wherein at least one electronic message is automatically sent to each of the plurality of first search results containing information in the query; receiving at least one second search result, wherein a third party contacts the user directly with the at least one second search result; and the user terminating the at least one second search result by removing the query from the search engine.

In general, the present invention employs an image based search engine that directly connects consumers with business for the purpose of completing transactions. The user (consumer) can capture a representation of an item and upload it to the secure search engine. The representation may comprise an image or video or the like. Additionally, the user can further include textual descriptions of the item in their query.

Once the image and/or textual description are uploaded to the search engine, the user can choose how they wanted to be contacted with prospective matches. A user may receive a number of internet based search results from indexed web pages returned from their query. The system then automatically sends an electronic message to each of these third party search results. The third party can then check the contents of the electronic message and potentially make contact with the query creating user. The user can choose to be contacted by email, phone, fax, or the like or any combination thereof from a third party vendor. Depending on the chosen methodology some responses may be received sooner than others. Once the user (consumer) is satisfied with the results of their search, the search can be terminated and the responses, results, and solicitations will cease.

The present invention provides benefits for the consumers and businesses alike. The consumers can receive competitive offers for the item which they seek. Additionally, the search process can be expedited and can provide consumers with a way to find the location or business offering an item that may be rare or otherwise difficult to find or obtain.

The businesses, in turn, have the ability to foster trusting relationships and potentially up sell the consumer on certain items. It also lets businesses know when someone is actively looking to make a purchase rather than wondering if an item is in stock or will go on sale.

In general, the present invention succeeds in conferring the following, and others not mentioned, benefits and objectives.

It is an object of the present invention to provide an image based search engine that provides the ability to conduct textual based queries or upload images for searching.

It is an object of the present invention to provide an image based search engine that connects consumers and businesses.

It is an object of the present invention to provide an image based search engine that saves the consumer time and money.

It is an object of the present invention to provide an image based search engine that provides the consumer the ability to terminate queries preventing unwanted soliciting.

It is an object of the present invention to provide an image based search engine that is relatively inexpensive and efficient.

It is an object of the present invention to provide an image based search engine that provides a greater investment return than traditional advertising methodologies.

It is an object of the present invention to provide an image based search engine that provides a channel for consumers to find and purchase items online that meet their full specifications.

It is an object of the present invention to provide an image based search engine that can communicate with a number of entities based on the search query to expedite the search process.

It is an object of the present invention to provide an image based search engine that benefits consumers and business alike.

DETAILED DESCRIPTION OF THE DRAWINGS

Figure 1:
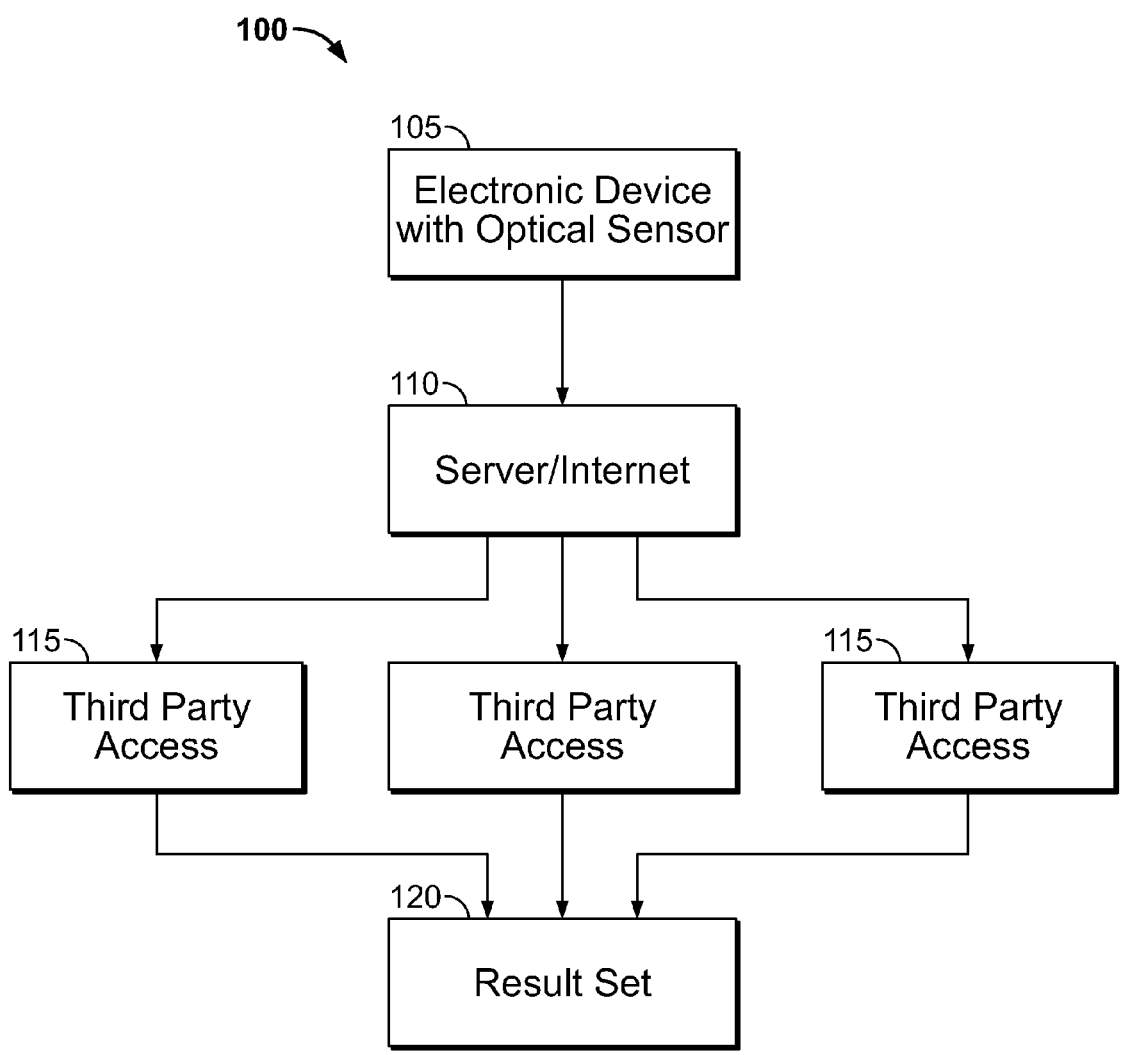
FIG. 1 is a block diagram showing an overview of the present invention from the consumer's perspective.

The preferred embodiments of the present invention will now be described with reference to the drawings. Identical elements in the various figures are identified, as far as possible, with the same reference numerals.

Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto without deviating from the innovative concepts of the invention.

The overarching goal of the invention is to provide an image based search engine that directly links the consumer to the vendors they desire rather than simply providing a list of possible vendors. This can be achieved via a number of methodologies including automatically contacting all entities returned in a search query for a particular item, service, product, etc.

Referring now to FIG. 1, there is a block diagram illustrating the overview of the present invention from the consumer's end. The consumer's experience 100 is driven by employing an electronic device (i.e. smartphone, web cam, tablet, gaming system, etc.) to capture the representation of an item the consumer desires 105. The representation of the item may be a static or time varying image. The image, in some instances, may previously exist in an online gallery, storage device (i.e. memory card), and other previously fixed mediums.

In block 110, that representation, potentially combined with textual descriptors or search constraints, is uploaded to a server connected to a network such as the internet. This occurs via an input field of a search engine similar to such existing technologies. Once the representation and/or textual query is uploaded the system returns any number of relevant results. Preferably, the system then accesses email addresses for the returned results and automatically emails the query to the entity. This may be accomplished via algorithms and other logic employed by the system to correctly ascertain and contact these entities with the query specifically.

In block 115, a third party accesses the uploaded information through the server. As stated, this can be accessed a number of ways including and preferably via email. Any number of third parties may or may not be able to access the particular information based on various constraints placed on the item when it was uploaded to the server.

Thus, the system may ping all emails of the returned results or only the results that fit within the defined constraints placed on the query by the user. Such constraints may comprise price, location, or the like or any combination thereof. It should be noted that the third parties can comprise a number of entities including business, corporations, vendors, wholesalers, retailers, and the like or any combination thereof.

Based on the system constraints and third party assessments related to the particular uploaded item, search results or returns are generated, in block 120, and these results are returned to the consumer. Thus, the image based search initially returns results based on the image and/or textual query and then provides actual results from the third party electronic mailings from vendors and the like that have the product in question and can meet any and all constraints placed on the search by the user.

Figure 2:
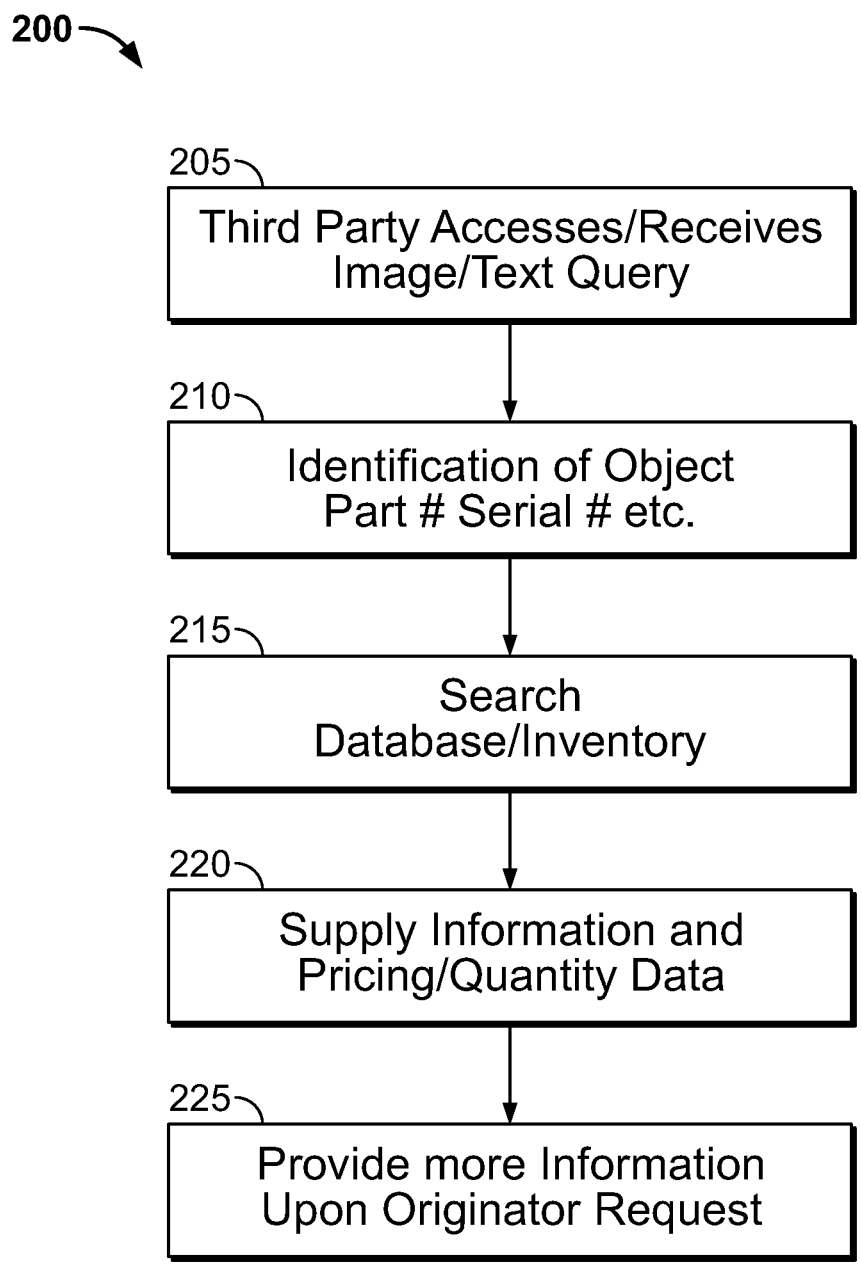
FIG. 2 is a block diagram showing an overview of the present invention from the third party's (business) perspective.

In FIG. 2, there is an overview of the image based search process from the third party's (vendor) perspective. The third party vendor experience 200 begins in block 205 where the third party receives or accesses an image, and/or video, and/or textual query via electronic mail or other electronic message. This query may involve a number of descriptors or constraints as the consumer is looking to find a particular number, style, color, shape, price, location, or quality of a particular item.

In block 210, the third party identifies the particular item using the information on either the product image itself or the textual descriptors or constraints supplied by the consumer. Identification may be achieved using part numbers, serial numbers, visual cues, and the like. In some instances, the constraints selected by the consumer and their description of the item may be the only information required for identification.

In block 215, the third party can optionally then consult their own database/inventory to ascertain whether they carry the exact item, a similar item, and whether or not the item is in stock ready for shipment or pick up. This enables the third party to readily meet the user's query.

Then, in block 220, the third party can supply the information germane to the particular product or item including the matching characteristics, the quantity available, pricing options, and so forth to the consumer. This information may be supplied via a number of avenues including phone, text, email, fax, and the like or any combination thereof. The user may or may not receive the communication depending on the user constraints, the status (opened/closed/etc.) of the query, and the like.

In block 225, upon a consumer request, the third party may be able to supply follow up information regarding the appropriate item to definitively ascertain if the item is desired by the user.

Figure 3:
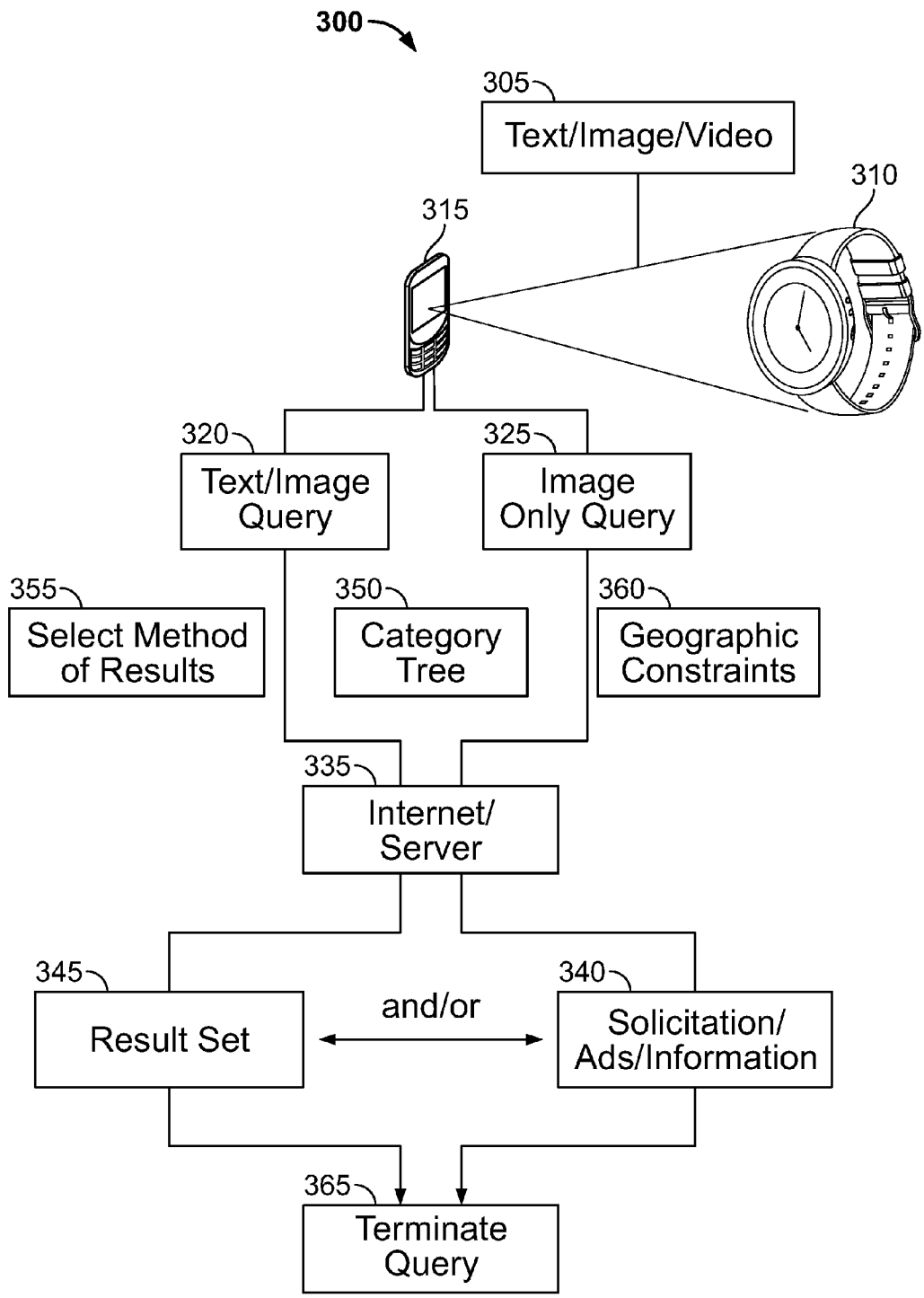
FIG. 3 is a diagram illustrating the search methodology of the present invention.

FIG. 3 illustrates the general search methodology applicable to the present invention. The method 300 begins with a query comprising a textual description of an item or a representation of an item or any combination thereof 305. The textual descriptors may comprise product information not readily visible or discernable including part numbers, product numbers, serial numbers, and consumer preferences such as quantity or color. In theory, the nature of the textual descriptors is virtually limitless.

The representation of the item may manifest itself in the form of a video or image or a combination of such visual representations captured by an electronic device 315 of the queried item 310 or from an image found and/or collected in another previously fixed medium (i.e. website, gallery, etc.). The electronic device 315 should have an optical sensor, preferably a digital camera, in order to capture such videos and/or images.

The image may be uploaded directly forming a query as illustrated in box 325. Alternatively, the image may be combined with a textual description as shown in box 320. Generally, either form of searching is permissible; however, the consumer is likely to have more targeted results by supplying the most information possible. Thus, the consumer can elect to narrow the search additionally by using a category directory tree to efficiently and expeditiously find the correct item 350.

The category tree enables the consumer to systematically narrow the search based on preset categorical descriptions. For example, the consumer is looking for lead-free, yellow paint. The consumer may navigate through the directory tree by selecting home improvement<exterior finishings<paint<lead-free<color=yellow. Thus, the consumer will be able to upload a query with a picture of a can of paint visible to paint vendors. An additional textual description upload with the image may comprise a particular shade of yellow such as canary yellow and a particular brand. Thus, vendors will know the type and color of paint the consumer is searching for and can reply appropriately.

The consumer can further limit their search results and scope of search according to blocks 355 and 360. In block 355 the consumer can select the method by which they would like to receive their search results. The consumer can receive the results in a number of ways including but not limited by phone, text, email, fax, or a combination thereof.

Additionally, the consumer can use geographic constraints, as shown in block 360, to limit the scope of the search. For example, the consumer may desire to pick up the item or avoid undue shipping costs, and can select that the generated search will only be available to those third parties within a 50 mile radius. Further, a global positioning system (GPS) chip within the electronic device 315 may be able to pinpoint the location of the electronic device 315 and use those coordinates for the location of a geographic constraint.

The query is then executed by uploading the search information to the server 335. First level results are then generated based on the consumer's preferences as shown in blocks 340 and 345.

In block 345, a result set is generated based on information mined or extracted from the search query by various algorithms. The results can be sent in a list formate or organized according to certain criteria such as relevance, top rated, number of review, location, and the like or a combination thereof. It is preferable, at this point, that targeted email queries are then directed to each of the returned entities to expeditiously ascertain if the entity or third party has the item(s) available.

Alternatively, the search results, as shown in block 340, may comprise direct solicitations from third party vendors for offers to purchase for a particular price, advertisements for the particular product, or further product information based on the search query. The result sets from boxes 340 and 345 may be received in separate or in tandem. A search filter may be able to further separate out certain types of search results. The consumer makes choice(s) based on the search results and when satisfied with the search or after has completed a purchase can terminate the query as shown in box 365, thereby ending any subsequent solicitations, offers, or the like.

Figure 4:
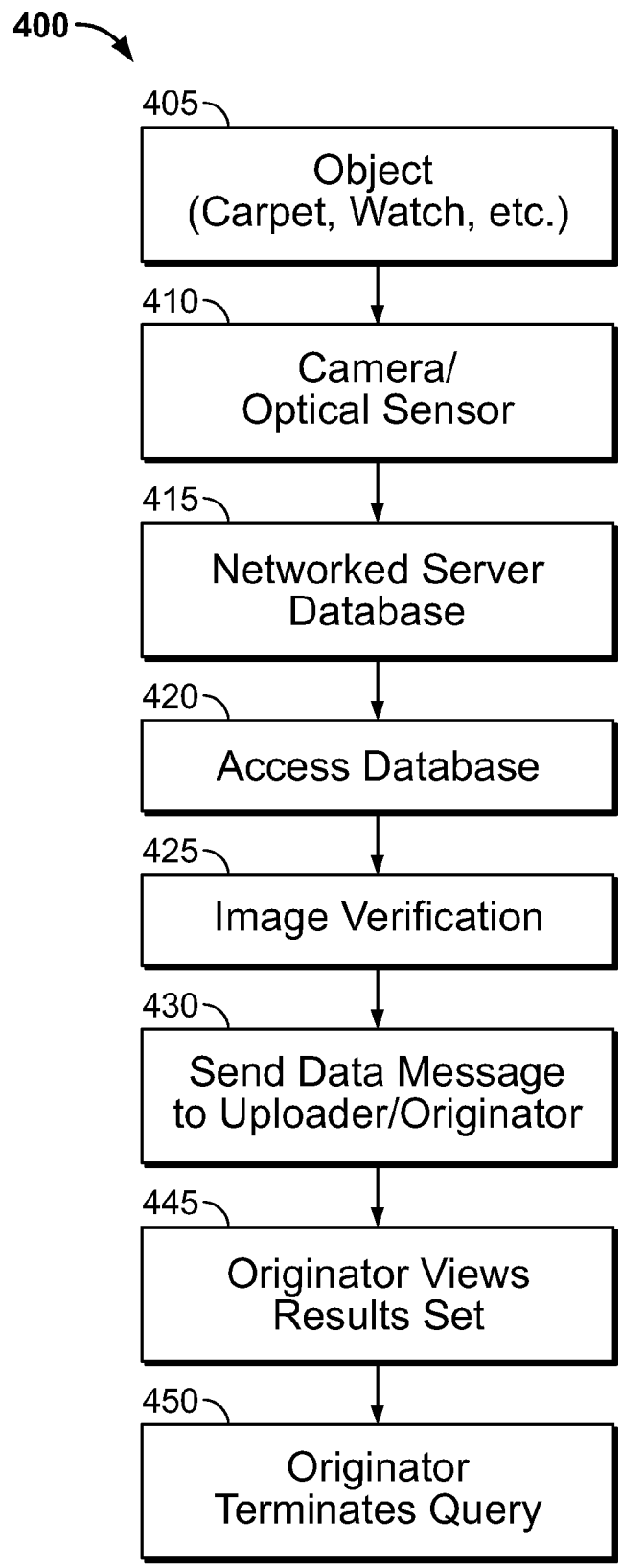
FIG. 4 is a detailed flowchart illustrating the searching process for the consumer.

FIG. 4 is a flowchart illustrating the process of making a consumer oriented image based search query to a business provider from start to finish. The overall process 400 starts with an object 405. The object or item can be any number of items that may readily be available from vendors including but not limited to home improvement materials, computers, computer software, sporting goods, clothing, lawn care, swimming accessories, food, books, jewelry, shoes, electronics, furniture, eating utensils, and the like. Further, the services, related or not, to these items may be available through the process. The items are virtually limitless and only limited by the imagination of those involved.

A representation of the item is captured by an electronic device having an optical sensor 410. The optical sensor is preferably a digital camera having image capturing and video recording capabilities. The electronic device can be any number of suitable devices including desktop computers, lap top computers, digital cameras, video recorders, smart phones, PDAs, gaming systems, and the like. The electronic device virtually may be any device with image capturing capabilities. In some instances, the image may be found in an existing online gallery or other fixed medium by which the user directly uses that representation or uses their electronic device to subsequently capture that previously fixed media.

The representation of the image is uploaded along with an optional textual description to the networked server database 415. The database may be a general collection of indexed web pages or manifest itself in a secure website where vetted business vendors can have a paid subscription to access the site and the uploaded consumer queries.

In some embodiments, the present invention may provide for a "sharing" functionality (i.e. the publishing or transfer of a user's digital images via a network) in order to upload images to the database and/or connect images with other shared images. For example, an image is uploaded to the database and the user subsequently hits the clickable "share" icon. The user may choose from any number of social media accounts including but not limited to Facebook, Twitter, LinkedIn, and the like. A caption or message may appear with the shared image such as "can someone help me find this item?" or "does anyone recognize this item?" Thus, the powerful tool that is social media may provide for an enhanced layer of positive search results and/or feedback.

Conversely, images on social media may be able to be "shared" to the present invention and its embodiments. This functionality enables digitally stored images residing on a particular website or in the cloud to be readily uploaded to the present invention. If the same or similar image is uploaded to the present invention via the social media site, the images may be able to be "connected." That is, the images are deemed to be the same and thus are grouped together and if such an image was previously uploaded with a positive result or feedback, then that existing positive result or feedback may be able to be instantaneously applied to the presently uploaded case.

The database may then be accessed using the supplied credentials 420. In some instances, the information is supplied directly to third party vendors without the need for a dedicated portal to access the queries. It may be preferable, as noted above, that general electronic mail or other electronic messaging queries are sent to any relevant third party. Regardless of the methodology, the business vendor, or third party, then can search through any number of uploaded and received queries to ascertain whether or not the item is in stock with a particular third party vendor through image/description verification 425.

A third party may be able to narrow the field of the queries to items they would carry. For example, a hardware store would be able to filter out electronics queries in order to efficiently find and contact the consumer with the regard to particular queries. Alternatively, the algorithm used may prevent or limit most of such unwanted or unrelated queries. The third party then, depending on the consumer query settings, can contact the consumer directly or respond to the query with a typical search result type solicitation 430.

The consumer originator of the query can then respond/view the results 445. These results may take the form of a phone call, text, fax, or email, and the like. Additionally, the consumer may be able to log on to the search engine database to view potential leads sent by the third party vendors. The consumer can then make a decision on whether to order and ship or pick up the item from a particular vendor. Once the consumer is satisfied the query has been met and no longer wishes to receive results, the consumer terminates the query 450, which prevents further third party contact with the user.

What is claimed is:

1. An interactive searching system comprising:
   an electronic mobile device configured to be operated by a user, the electronic mobile device having an optical sensor configured to capture a representation of an item;
   a server computer coupled to a network, the server computer having a categorized database,
      wherein the user uploads at least the representation of the item to the server computer via the network,
      wherein results are returned to the user, and
      wherein at least one third party corresponding to the results is automatically contacted via an electronic message,
         wherein the at least one third party corresponds to one or more constraints selected by the user; and
   a plurality of computers configured to access the network,
      wherein the at least one third party uses at least one of the plurality of computers to access the electronic message and ascertain whether an item corresponding to the representation of the item uploaded to the categorized database is present in an inventory of the at least one third party.

2. The system of claim 1 wherein the optical sensor is a camera on a mobile electronic device.

3. The system of claim 1 wherein the representation of the item is a static image or a time varying image.

4. The system of claim 1 wherein a password, code, key or any combination thereof is required to access the categorized database.

5. The system of claim 1 wherein if the item is present in the third party's inventory, then information pertaining to the item is transmitted back to the originating electronic mobile device.

6. The system of claim 5 wherein the information transmitted relates to the item's condition, quantity, price, size, weight, or any combination thereof or any other relevant technical specifications.

7. The system of claim 1 wherein a global positioning system (GPS) unit in the electronic mobile device limits access by third parties to location specific queries.

8. The system of claim 1 wherein the categorized database is a collection of indexed web pages.

9. The system of claim 1 wherein the electronic message is an electronic mail message.

10. The system of claim 1 wherein the one or more constraints are selected from the group consisting of number; style; color; shape; price; location; and quality.

11. A method of image based searching using a search engine comprising:
   a user creating, a query comprising at least a representation of an item and/or a textual descriptors;

sending said query to a search engine;
receiving a first set of search results,
   wherein at least one electronic message is automatically sent to at least one third party corresponding to the first set of search results,
      wherein the at least one third party corresponds to one or more constraints selected by the user, and
   wherein the first set of search results are indexed web pages;
receiving a second set of search results,
   wherein receiving the second set of search results comprises a third party contacting the user directly; and
the user removing the query from the search engine.

12. The method of claim 11 wherein the representation of the item is a static image or a time varying image.

13. The method of claim 11 wherein the search results contain product information including technical specifications and pricing options.

14. The method of claim 11 wherein the third party responses are offers for sale or solicitations for offers for sale.

15. The method of claim 11 further comprising the step of, using a category directory tree to limit either of the first search results or the at least one second search result,
   wherein the category directory tree contains at least modifiers to narrow the scope of the query.

16. The method of claim 15 wherein the category directory tree limits the geographic scope of the search.

17. The method of claim 11 wherein the one or more constraints are selected from the group consisting of number; style; color; shape; price; location; and quality.

\* \* \* \* \*